United States Patent [19]

Matsuzawa et al.

[11] Patent Number: 5,012,572
[45] Date of Patent: May 7, 1991

[54] METHOD FOR PRODUCING A HEAD CORE SLIDER

[75] Inventors: Soichiro Matsuzawa, Kuwana; Fuminori Takeya, Nagoya, both of Japan

[73] Assignees: NGK Insulators, Ltd., Nagoya, Japan; Applied Magnetics Corporation, Goleta, Calif.

[21] Appl. No.: 322,161

[22] Filed: Mar. 13, 1989

[30] Foreign Application Priority Data

Mar. 31, 1988 [JP] Japan .................. 63-80133

[51] Int. Cl.⁵ ............................................. G11B 5/42
[52] U.S. Cl. ................................. 29/603; 360/103; 360/122
[58] Field of Search ............ 29/603; 360/103, 104, 360/105, 119-121, 126, 127, 122

[56] References Cited

U.S. PATENT DOCUMENTS

| 3,514,851 | 6/1970 | Perkin et al. | 29/603 |
| 4,078,300 | 3/1978 | Lazzari | 29/603 |
| 4,100,584 | 7/1978 | Behr et al. | 29/603 X |

FOREIGN PATENT DOCUMENTS 209140 1/1987 European Pat. Off. .

Primary Examiner—Carl E. Hall
Attorney, Agent, or Firm—Parkhurst, Wendel & Rossi

[57] ABSTRACT

A head core slider for a rigid magnetic disk drive, and a method of producing the same. The core slider includes a slider body, a track portion, a yoke portion and a narrow stepped portion. The slider body has two spaced-apart parallel air bearing portions, and the track portion is formed integrally with at least one of the bearing portions, so as to extend from one end of the bearing portion in the direction of length of the bearing portion. The track portion has the same height as the bearing portion, and a width smaller than that of the bearing portion. The yoke portion is formed integrally with the track portion, so as to extend from one end of the track portion remote from the bearing portion, and has a protrusion of the same height as the track portion. The width of the protrusion is smaller than that of the bearing portion and larger than that of the track portion. The stepped portion is formed so as to surround at least the track portion and the protrusion of the yoke portion, and has a surface which is spaced apart from top surfaces of the track portion and the protrusion by a distance nearly equal to the predetermined height. The bearing, track and stepped portions and the protrusion are formed by etching the surfaces of two bonded ferrite blocks, through an etching mask pattern corresponding to the desired configuration to be formed.

15 Claims, 7 Drawing Sheets

METHOD FOR PRODUCING A HEAD CORE SLIDER

BACKGROUND OF THE INVENTION

1. Field of the Invention

The present invention relates to improvements in a floating-type core slider of a magnetic head for a rigid magnetic disk drive.

2. Discussion of the Prior Art

In the art of a rigid magnetic disk drive (sometimes abbreviated as "RDD"), there is known a floating-type magnetic head which employs a bulk type core slider, such as a monolithic type slider as indicated generally at 1 in FIG. 1. This core slider 1 is an integral structure consisting of a slider body 2, and a yoke portion 3 which is generally C-shaped in cross section. On one surface of the slider body 2 on which a recording medium in the form of a magnetic disk slidably rotates, there are formed a pair of parallel spaced-apart air bearing portions 4a, 4b which extend in the rotating or sliding direction of the magnetic disk. The sliding surfaces of the air bearing portions 4a, 4b have a suitable height as measured from a recessed portion therebetween. The core slider 1 has a center rail 5 which is formed between the air bearing portions 4a, 4b so as to extend parallel to the air bearing portions. The center rail 5 serves as a track portion whose surface has the same height as the air bearing portions 4a, 4b. In operation, the selected recording track of the magnetic disk is aligned with the track portion or center rail 5. The yoke portion 3 indicated above is formed integrally with the slider body 2, at one of opposite ends of the center rail 5. The yoke portion 3 and the slider body 2 cooperate with each other to define a closed magnetic path for the magnetic head.

The monolithic type core slider 1 formed solely of a ferrite material is rlatively economical to manufacture. The width of the elongate track portion is determined by tapering or chamfering the parallel edges of the center rail 5. This manner of forming the track portion suffers from difficulties in precisely establishing the desired track width, and in reducing the track width. Further, when the core slider 1 is moved off the surface of the magnetic disk, both air bearing portions 4a, 4b should lie within the range of radius of the magnetic disk. Namely, the center rail or track portion 5 located between the two air bearing portions 4a, 4b should be positioned a given distance away from the outer periphery of the magnetic disk in the radially inward direction. Therefore, the effective recording surface area of the magnetic disk is reduced to an extent corresponding to the distance between the track portion 5 and the air bearing portion 4a, 4b. In other words, the data storage capacity of the magnetic disk is limited by the construction of the core slider 1.

There is also known a composite type core slider which is produced by a slider body and a head core which are separately prepared. More specifically, a ferrite core having a track portion formed perpendicularly to a surface thereof is partially embedded in and fixed to a non-magnetic slider body. This composite type core slider is advantageous over the monolithic type, in that the track portion can be formed with its width accurately controlled to a desired value, and that the width can be made relatively small. The composite type is further advantageous in that the track portion can be formed in alignment with an air bearing portion, i.e., formed on a line of extension of the air bearing portion, whereby the outer peripheral portion of the magnetic disk can be used as an effective recording area. However, the composite type core slider is disadvantageous in the cost of manufacture, because of the steps of separately preparing the slider body and the core, and then joining these two members together.

A further type of core slider is proposed according to laid-open Publication No. 62-18615 of unexamined Japanese patent application, in an attempt to lower the cost of manufacture while enjoying the functional advantages of the composite type discussed above. In this proposed core slider, a yoke portion is formed integrally with a slider body, at one end of an air bearing portion formed on the slider body, such that the yoke portion and the slider body cooperate to constitute a head core which has a magnetic gap. To produce this core slider, grooves defining a track portion are formed in appropriate two blocks, and the two blocks with the grooves filled with a glass material are butted together and bonded by the glass material, such that selected parts of the joining surfaces define the magnetic gap therebetween. Subsequently, the obtained body of the bonded blocks is subjected to a grooving operation to form the air bearing portion and the yoke portion.

In the core slider of the type described above, the track portion is in line with the air bearing portion, and therefore these two portions may be concurrently formed by the grooving operation, contrary to the air bearing and track portions of the monolithic type core slider which are spaced apart from each other. However, this type of core slider requires the step of establishing the desired width of the track portion by the grooving operation, and an additional step of filling the grooves with the glass material, and consequently suffers from a relatively increased total number of process steps, which counterbalances the advantage of the concurrent formation of the track and air bearing portions. In addition, the cross sectional area of the yoke portion of the core slider in question tends to be larger than that of the composite type core slider and the monolithic type core slider of FIG. 1. This results in an increase in the inductance of the head core, which is disadvantageous in performing high-frequency recording operations on the magnetic disk. That is, the core slider is not capable of assuring sufficiently high density of recording per unit area of the magnetic disk.

For producing the conventional core slider as shown in FIG. 1 wherein two spaced-apart air bearing portions and a center rail are provided, the grooving operations to form the air bearing portions and center rail and the chamfering operations to determine the width and length of the formed bearing portions and rail are performed by using a grinding wheel such as a diamond wheel. The grooving and chamfering operations require a total of eight grinding passes for each core slider, and are the most time-consuming steps of the process. Further, the error in the widths of the air bearing portions and track portion (center rail) cannot be held within a permissible range of ±3 microns, due to unavoidable positioning error of the grinding wheel, and due to inevitable variations in the thickness or height of the blank for the slider body and positioning error of the yoke portion bonded to the slider body blank. Moreover, the surfaces finished by the diamond wheel inevitably suffer from chipping of one micron or more.

SUMMARY OF THE INVENTION

It is therefore a first object of the present invention to provide a head core slider for a rigid magnetic disk drive, which has no chamfered portions at the trailing end and which is adapted to effectively protect its track portion and a magnetic disk against damage and to provide a head core having a relatively low inductance, for thereby permitting a high-frequency recording operation on the magnetic disk, in order to increase the recording density per unit area of the disk.

It is a second object of the present invention to provide an improved method of producing such a head core slider in an economical manner, with a reduced number of process steps, as compared with the conventionally available methods.

The first object may be achieved according to one aspect of the present invention, which provides a head core slider for a rigid magnetic disk drive, comprising a slider body, a track portion, a yoke portion and a narrow stepped portion. The slider body has a pair of parallel air bearing portions which are spaced apart from each other in a first direction and each of which has a predetermined height and a first width in the first direction. The track portion is formed integrally with at least one of the parallel air bearing portions, so as to extend from one of opposite ends of the air bearing portion in a second direction substantially perpendicular to the first direction. The track portion has the same height as the air bearing portion, and a second width smaller than the first width. The yoke portion is formed integrally with the slider body and the track portion, so as to extend from one end of the track portion remote from the air bearing portion in the second direction. The yoke portion has a protrusion which has the predetermined height and a third width which is smaller than the first width and larger than the second width. The slider body, the yoke portion and the track portion cooperate with each other to form a magnetic head core which has a closed magnetic path, the stepped portion is formed extending so as to surround at least the track portion and the protrusion of the yoke portion. The stepped portion has a surface which is spaced apart from top surfaces of the track portion and the protrusion in a third direction perpendicular to the first and second directions, by a distance corresponding to the predetermined height.

The second object indicated above may be attained according to another aspect of the invention, which provides a method of producing a head core slider for a rigid magnetic disk drive, comprising the following steps. (i) A first ferrite block which gives a slider body, and a second ferrite block which gives a yoke portion are prepared and butting together into an integral ferrite bar which defines a closed magnetic path having a magnetic gap. (ii) An etching mask is formed on a surface of the integral ferrite bar, the etching mask having a pattern which corresponds to a configuration formed on the surface of the integral ferrite bar. The configuration includes (a) a pair of parallel air bearing portions provided on the slider body such that the air bearing portions are spaced apart from each other in a first direction each of the air bearing portions having a first width in the first direction, (b) a track portion formed integrally with at least one of the pair of parallel air bearing portions, so as to extend from one of opposite ends of the air bearing portion in a second direction substantially perpendicular to the first direction, the track portion having a second width smaller than the first width, and (c) a protrusion provided on the yoke portion such that the protrusion extends from one end of the track portion remote from the air bearing portion in the second direction, the protrusion having a third width which is smaller than the first width and larger than the second width. (iii) At least the surface of the integral ferrite bar is etched, via the etching mask, so as to produce the configuration corresponding to the pattern of the etching mask, such that the pair of air bearing portions of the slider body, the protrusion of the yoke portion, and the track portion between the bearing portion and the protrusion have a same predetermined height. (iv) The etched integral ferrite bar is cut into a plurality of pieces each of which serves as the head core slider, such that the each piece having the slider body, the yoke portion and the track portion is provided with a narrow stepped portion extending so as to surround at least the track portion and the protrusion of the yoke portion. The stepped portion has a surface which is spaced apart from top surfaces of the track portion and the protrusion in a third direction perpendicular to the first and second directions, by a distance corresponding to the predetermined height.

A magnetic head for a rigid magnetic disk drive is obtained by winding a coil on the head core slider of the present invention constructed as described above. The magnetic head is moved between a first position in which the sliding surface of the core slider contacts the surface of the magnetic disk, and a floating or second position in which the slider surface is spaced from the surface of the disk. In operation of the magnetic disk drive, it is important that the magnetic disk be protected against damage upon movements of the magnetic head to and from the first and second positions to effect and release the contact between the core slider and the disk. This damage of the magnetic disk depends upon the surface conditions of the core slider, more specifically, the surface conditions of the air bearing portions and the track portion, and upon the edge configuration of these bearing and track portions. If the surface conditions are poor, not only the disk but also the core slider may be damaged.

According to the present invention, the surface of the ferrite bar blank on the side of the magnetic disk is first ground to sufficiently high degrees of smoothness and straightness, and then an etching mask of a suitable material such as a photoresist is formed on the ground surface of the ferrite bar blank, in a pattern corresponding to the desired raised configuration including the air bearing portions, track portion and yoke portion. The surface of the ferrite bar blank is then subjected to an etching process, whereby the air bearing and track portions are formed with high degrees of surface smoothness and straightness. Thus, the conventionally experienced damage of the magnetic disk is avoided. Further, the substantially entire surface area of the magnetic disk can be utilized for storing information, because of the alignment of the track portion with the air bearing portion, whereby the effective recording capacity of the magnetic disk can be increased when the magnetic head uses the instant core slider.

Furthermore, the provision of the relatively wide protrusion which is in line with the track and air bearing portions and has the same height as these portions is effective to protect the relatively narrow track portion against damage upon movements of the magnetic head to and from the first and second operating positions indicated above.

Moreover, the narrow stepped portion provided around the track portion and the protrusion protects the track portion and protrusion against chipping thereof during cutting operations on the ferrite bar to remove the ferrite material surrounding the yoke portions and to cut the bar into the individual core sliders. In other words, there arises no problem even if the stepped portion chips during the cutting operations. Further, the instant core slider does not require a chamfered portion at its trailing end as viewed in the rotating direction of the disk.

In addition, the width of the yoke portion is made smaller than that of the air bearing portion, for reducing the cross sectional area of the magnetic path and thereby lowering the inductance of the magnetic head, so as to permit high-frequency recording operation on the magnetic disk. That is, the instant head core slider provides for an increased density of information recorded per unit area of the magnetic disk.

According to the method of the present invention, the etching process is utilized to form the desired configuration of the air bearing portions, track portions and yoke portions on the ferrite bar, with high dimensional accuracy. Consequently, the required number of process steps is significantly reduced, and the cost of manufacture of each core slider is accordingly lowered.

In one preferred form of the present invention, corners of each air bearing portion at its trailing end, and corners of the corresponding track portion at its trailing end are rounded to desired radii of curvature. Further, the connections between the track portion and the air bearing portion and yoke portion may be similarly rounded or chamfered or inclined. These rounded corners and connections and/or chamfered connections are effective to protect the track portion and the magnetic disk against damage upon movements of the magnetic head with respect to the magnetic disk. It is noted that these rounded and/or chamfered parts may be also formed in the etching process.

According to the present method of the invention wherein the etching process is used to form the air bearing, track and yoke portions, the angle of the side surfaces of these raised portions with respect to their top surfaces may be suitably controlled so as to provide an adequate compromise between the mechanical strength and the functional capability. The instant method does not require any machining operations to establish the desired dimensions (such as width) and profile of the individual portions of the head core slider, and is therefore free from the chipping problem experienced in the art. Where ferrite single crystals are used for the ferrite blocks, the above-indicated angle of inclination may be suitably held within a range of 65° and 80°, by using the crystal plane (100) as the surface of each block defining the magnetic gap, and the crystal plane (110) as the surface on which the air bearing and other portions are formed.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

To produce a head core slider for a rigid magnetic disk drive, a first and a second ferrite block are prepared. The first ferrite block is used to provide a slider body of the head core slider, while the second ferrite block is used to provide a yoke portion of the head core slider. These ferrite blocks are formed of a conventionally used ferrite material having a high degree of permeability. The ferrite blocks are generally elongate rectangular members having suitable thicknesses. The elongate ferrite blocks are butted and bonded together into an integral ferrite structure, from which two or more magnetic head cores are produced. The magnetic head core has a closed or annular magnetic path. The ferrite blocks having a high degree of permeability may consist of single crystals or polycrystalline structures of Mn-Zn ferrite or Ni-Zn ferrite, or may be a composite structure consisting of a single crystal ferrite portion and a polycrystalline ferrite portion. Where a ferrite single crystal is used for the ferrite block, one of the crystal planes (100), (110), (311), (332), (611) and (211) is used as an air bearing surface of the head core slider (as a sliding surface on which a magnetic disk slides).

Figure 1:
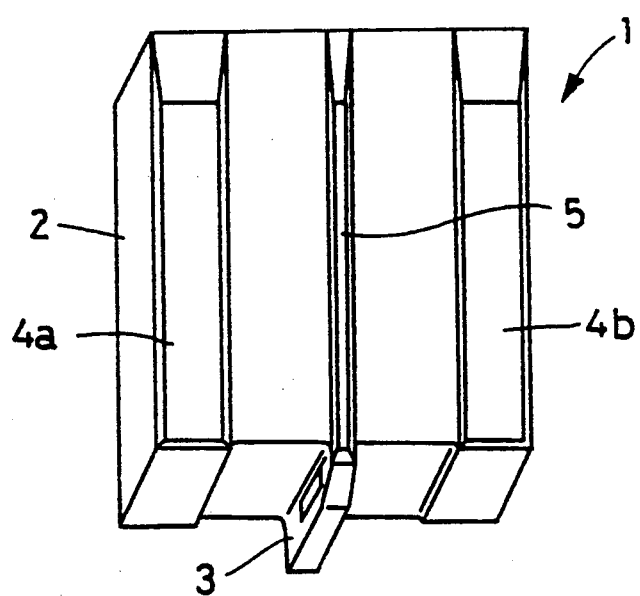
FIG. 1 is a perspective view showing one example of a known monolithic head core slider for a rigid magnetic disk drive.
Figure 2:
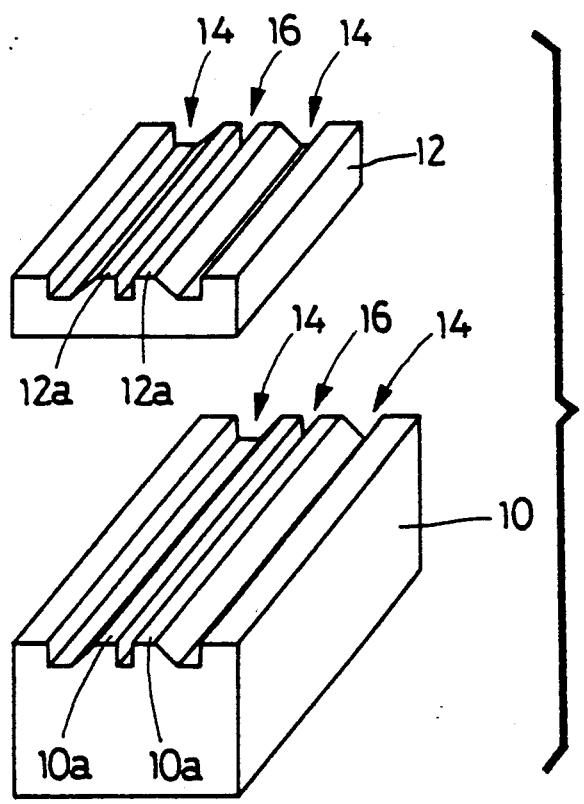
FIG. 2 is a perspective view of two ferrite blocks which are bonded together.

Referring to FIG. 2, the first and second ferrite blocks are illustrated at 10 and 12, respectively, by way of example. At least one of the first and second ferrite blocks 10, 12 has at least one coil groove 14 for winding a coil on a head core slider produced from the ferrite blocks. Each coil groove 14 is formed in one of opposite surfaces of the appropriate ferrite block 10, 12, in the longitudinal direction of the block. In this specific example of FIG. 2 wherein two head core sliders are prepared from the first and second ferrite blocks 10, 12, two coil grooves 14 are formed in both of the first and second ferrite blocks 10, 12 in the corresponding portions of the surfaces which define magnetic gaps of the prepared head core sliders, as described below. Between the two coil grooves 14, 14 in each of the ferrite blocks 10, 12, a center groove 16 is formed so as to extend parallel to the coil grooves 14. This center groove 16 is used to allow air to leak during a process of filling the magnetic gap with a glass material (which will be described hereinafter).

Figure 4:
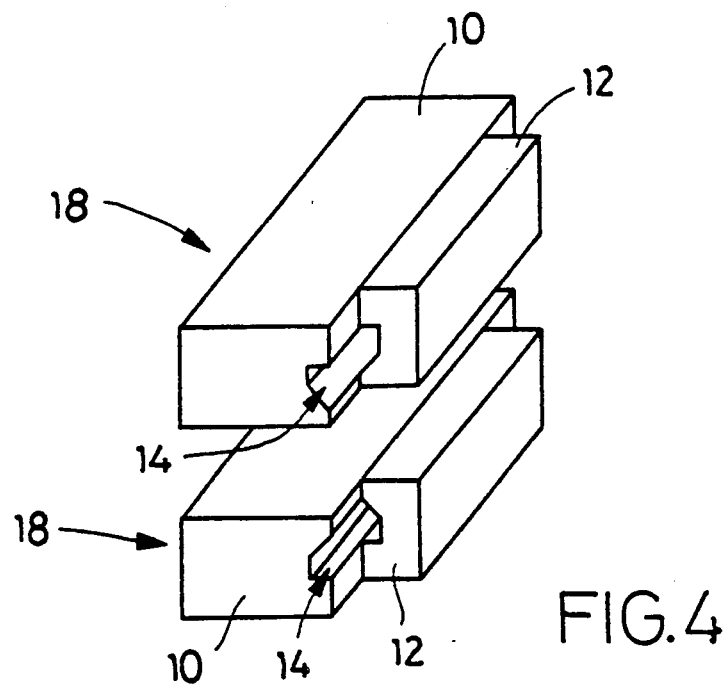
FIG. 4 is a perspective view of two ferrite bars prepared by cutting the ferrite structure of FIG. 3.
Figure 5:
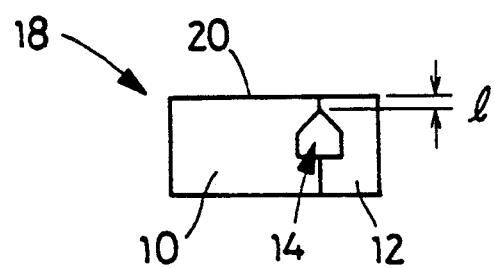
FIG. 5 is an end elevational view showing one of the two ferrite bars of FIG. 4, after the disk sliding surface of the ferrite bar is ground.

Elongate surface areas 10a left between the coil grooves 14 and the center groove 16 of the first ferrite block 10, and/or elongate surface areas 12a left between the coil grooves 14 and the center groove 16 of the second ferrite block 12, are subjected to an etching or other suitable process in which a suitable amount of stock is removed to define the above-indicated magnetic gaps, whose depth is indicated by character "l" in FIG. 5. It is desirable that the first and second ferrite blocks 10, 12 have different lengths, as indicated in FIG. 2, for facilitating the reading of the gap depth "l" when a surface 20 (FIG. 5) of each ferrite bar 18 (FIG. 4) obtained from the ferrite blocks 10, 12 is ground so as to establish the desired gap depth "l".

Figure 3:
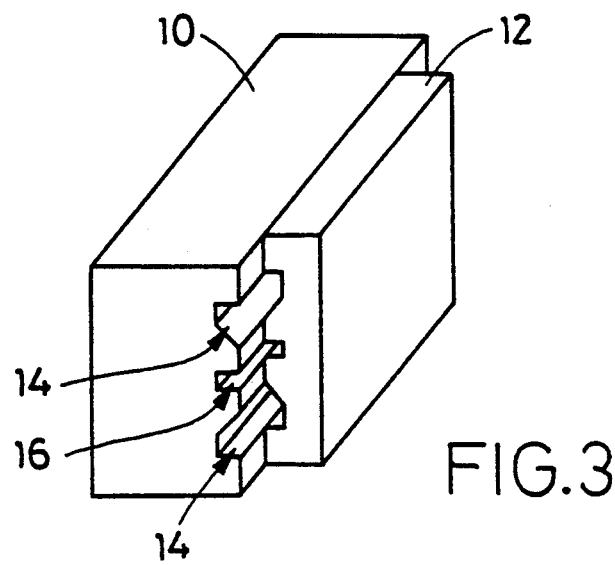
FIG. 3 is a perspective view of an integral ferrite structure prepared by bonding the two ferrite blocks of FIG. 2.

The first and second ferrite blocks 10, 12 each having the two coil grooves 14 and the single center groove 16 formed as described above are then butted together as shown in FIG. 3 such that the grooves 14, 16 in the two ferrite blocks 10, 12 are aligned with each other so as to form channels extending in the longitudinal direction of the blocks. The butted first and second ferrite blocks 10, 12 are bonded into an intergral ferrite structure, by a known solid reaction bonding method, a sintering method or other suitable bonding method. Subsequently, the gaps formed adjacent the center grooves 16 are filled with a suitable glass material which is introduced in a molten state through the above-indicated channels, so that the gaps are protected during the following steps of manufacture.

The prepared integral ferrite block 10, 12 is cut along the center grooves 16, into two ferrite bars 18, 18 as shown in FIG. 4. Each ferrite bar 18 has the channel 14.

Figure 6:
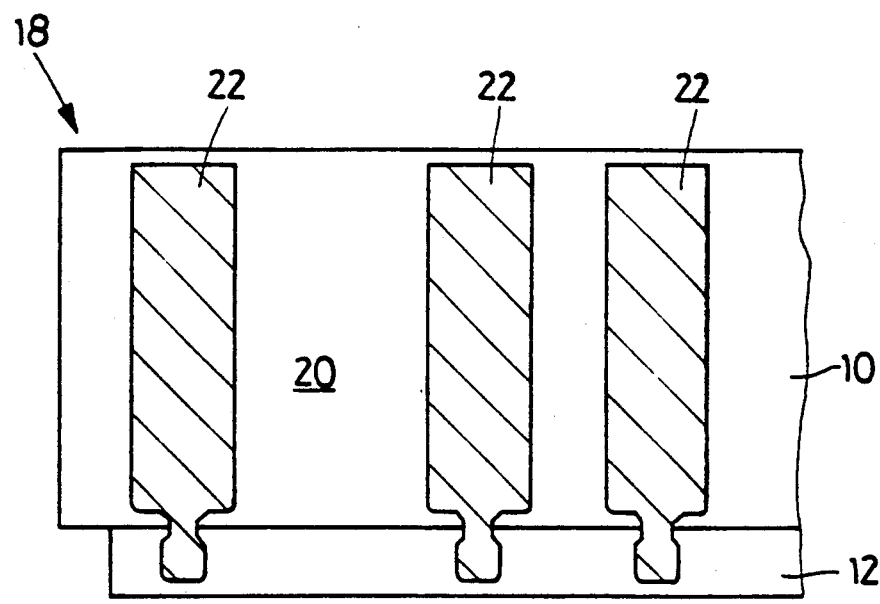
FIG. 6 is a fragmentary plan view showing the ferrite bar of FIG. 5, after an etching mask is formed on the ground surface.

The surface 20 which becomes a disk sliding surface of the finally obtained head core slider is ground so as to establish the desired depth "l" of the gap, as indicated in FIG. 5. This grinding process is also necessary to improve the adhesion of an etching mask 22 to the surface 20, when the mask 22 is formed in the following step, as indicated in FIG. 6, to form air bearing portions 24, track portion 26 and protrusions 28 (FIG. 7) of each head core slider eventually obtained from the ferrite bar 18, as described below. The grinding of the surface 20 also assures uniform amount of stock removal of the ferrite material over the non-masked portions of the ferrite bar 18.

As indicated above, the etching mask 22 is then formed on the ground surface 20, in a pattern corresponding to the configuration of the air bearing portions 24, track portion 26 and protrusions 28 of each head core slider. Described more specifically referring to FIG. 7, the air bearing portions 24 are formed parallel to each other in the direction perpendicular to the longitudinal direction of the ferrite bar 18, and are spaced apart from each other in the longitudinal direction of the ferrite bar 18. Each air bearing portion 24 has a predetermined height from the surface 20, and a predetermined width in the longitudinal direction of the ferrite bar 18. The track portion 26 is formed integrally with one end of each air bearing portion 24, so as to extend from the air bearing portion in the direction perpendicular to the longitudinal direction of the ferrite bar 18. The track portion 26 has the same height as the air bearing portion 24, and a width smaller than that of the air bearing portion 24. The protrusion 28 extends from one end of the track portion 26 remote from the air bearing portion 24 in the direction perpendicular to the longitudinal direction of the ferrite bar 18. The protrusion 28 has the same height as the air bearing and track portions 24, 26, and a width which is smaller than that of the air bearing portion and larger than the width of the track portion 24.

The etching mask 22 is formed by a suitable known method such as a screen printing technique, which is selected to meet the required forming accuracy and economy. In particular, a photoetching method using a photoresist is preferably practiced for relatively high pattern forming accuracy and relatively easy formation of the masking pattern. In this case, for example, the surface 20 of the ferrite bar 18 is entirely covered by a photoresist layer, and the portions of the photoresist layer which correspond to the above-indicated portions 24, 26 and protrusions 28 are removed to expose the corresponding portions of the surface 20 of the bar 18. The etching mask 22 may be formed of a positive or negative type photoresist, or formed of a suitable metallic material such as Cr, or SiO or $SiO_2$, by vacuum vapor deposition, sputtering, chemical vapor deposition (CVD) or other technique. The method of forming the mask 22 and the material of the mask 22 are suitably selected in terms of the ease and cost of formation, and the adhesiveness of the mask 22 to the surface 20.

Figure 7:
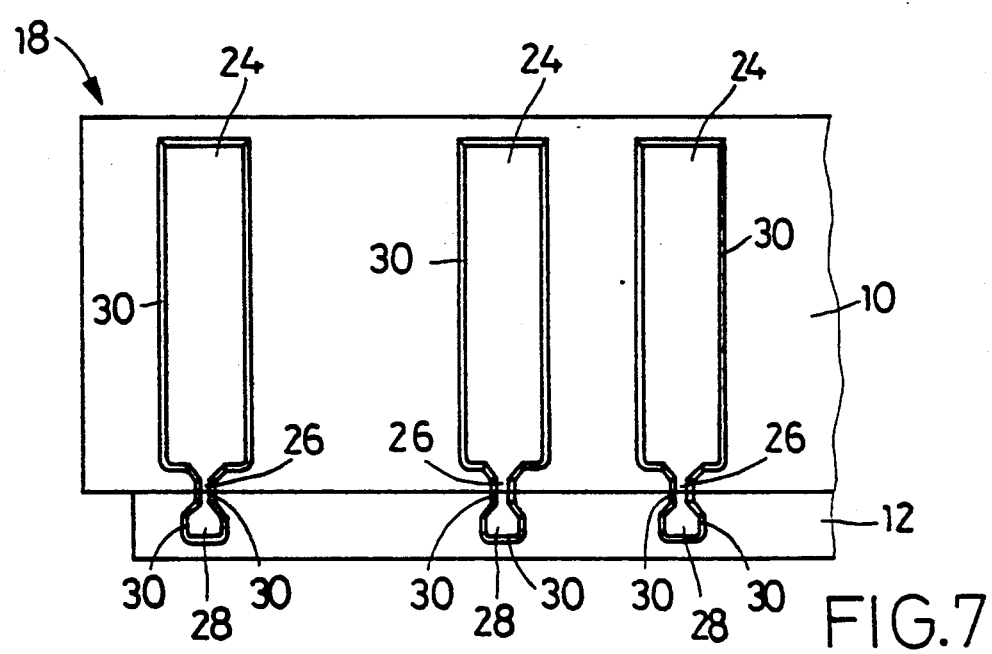
FIGS. 7 and 8 are fragmentary plan and elevational views of the ferrite bar which has been subjected to an etching process.
Figure 8:
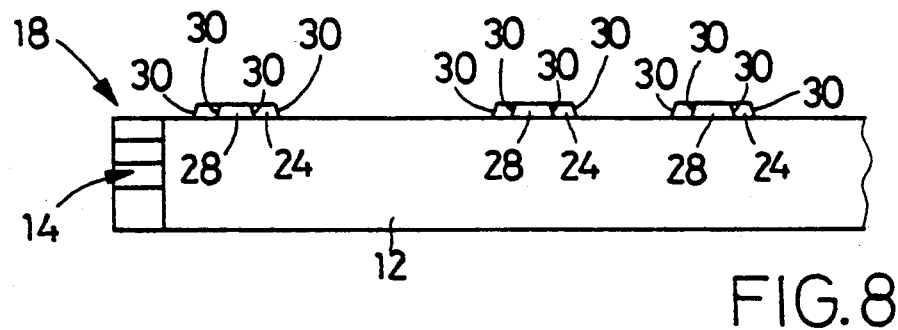

The ferrite bar 18 partially covered by the etching mask 22 is then subjected to an etching process to remove a suitable amount of stock from the non-masked portions of the surface 20. As a result, the portions 24, 26, 28 covered by the etching mask 22 are left unremoved as shown in FIGS. 7 and 8. These portions serve as the air bearing portion 24, track portions 26 and protrusions 28, which have been described. The ferrite bar 18 is usually etched by an ordinary electrolytic etching or chemical etching method, preferably by using an aqueous solution consisting of water and the balance principally consisting of phosphoric acid, as disclosed in Japanese patent application No. 60-222388 (laid open in 1987 under Publication No. 62-XXXXXX). With the ferrite bar 18 thus etched, inclined surfaces 30 are further formed surrounding the air bearing portions 24, track portions 26 and protrusions 28.

Figure 9:
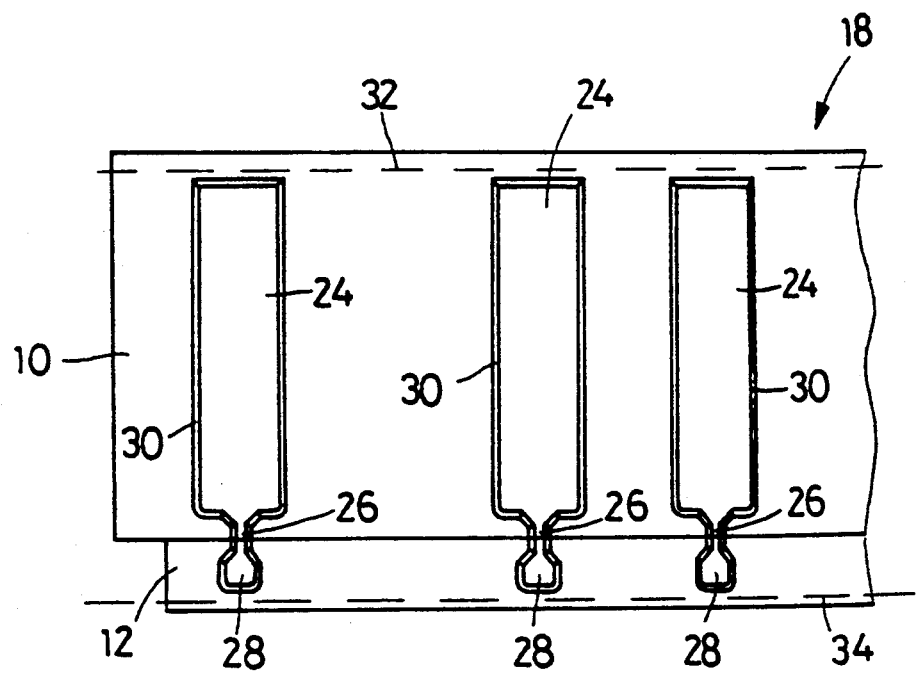
FIG. 9 is a fragmentary plan view of the etched ferrite bar, showing cutting lines along which the bar is cut to obtain a desired dimension in the direction perpendicular to the cutting lines.
Figure 10:
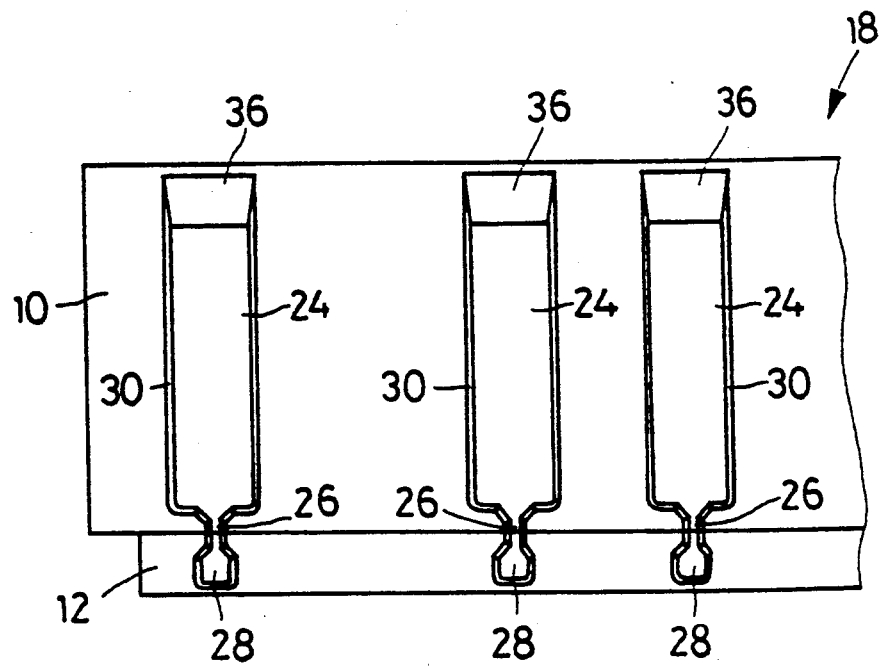
FIG. 10 is a fragmentary plan view showing the ferrite bar, after a chamfered surface is formed at the leading end portion of each air bearing portion.
Figure 11:
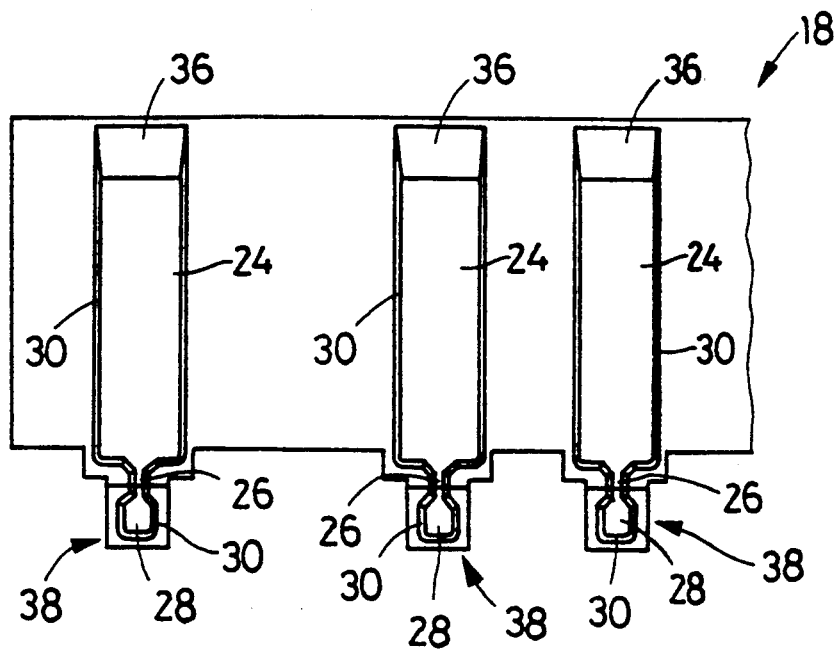
FIG. 11 is a fragmentary plan view of the ferrite bar, after yoke portions are formed by cutting off the appropriate portions of the bar.

The etched ferrite bar 18 is then cut parallel to its longitudinal direction, for instance, at cutting lines indicated at 32, 34 in FIG. 9, in order to determine the length of each eventually obtained head core slider, as measured in the longitudinal direction of the air bearing portions 24. Subsequently, the leading end portion of each air bearing portion 24 is cut to form a chamfered portion or leading ramp 36, as indicated in FIG. 10. This chamfered portion 36 is inclined at an adequate angle relative to the top surface of the air bearing portion 24. Then, the portions of the ferrite bar 18 which surround the trailing end portions of the air bearing portions 24, track portions 26 and protrusions 28 are removed so as to form yoke portions 38 which include the protrusions 28, as illustrated in FIG. 11. However, a suitable amount of the ferrite stock is left unremoved adjacent the periphery of the yoke portions 38. Each yoke portion 38 has a magnetic gap and an aperture corresponding to the coil grooves 14.

Figure 12:
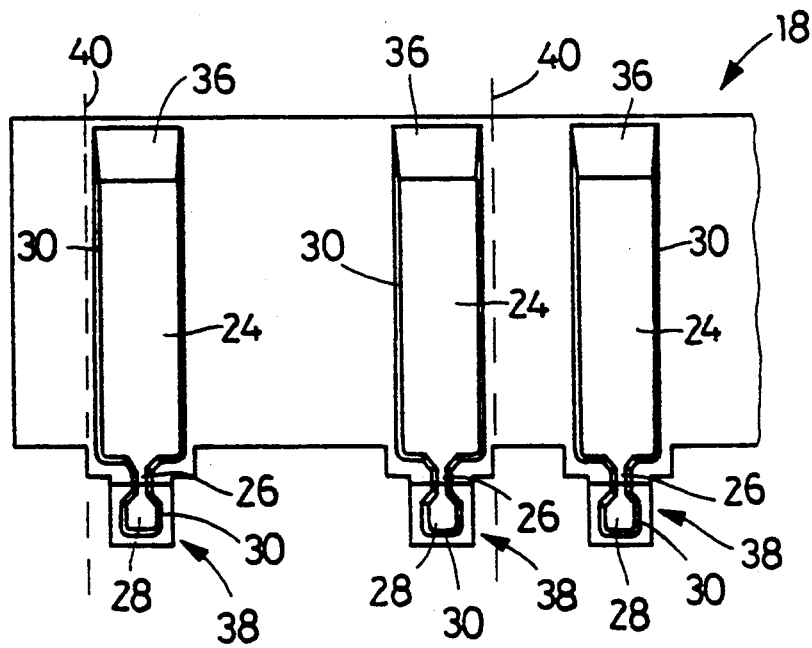
FIG. 12 is a fragmentary plan view showing cutting lines along which the ferrite bar of FIG. 11 is cut to obtain a single head core slider.
Figure 13:
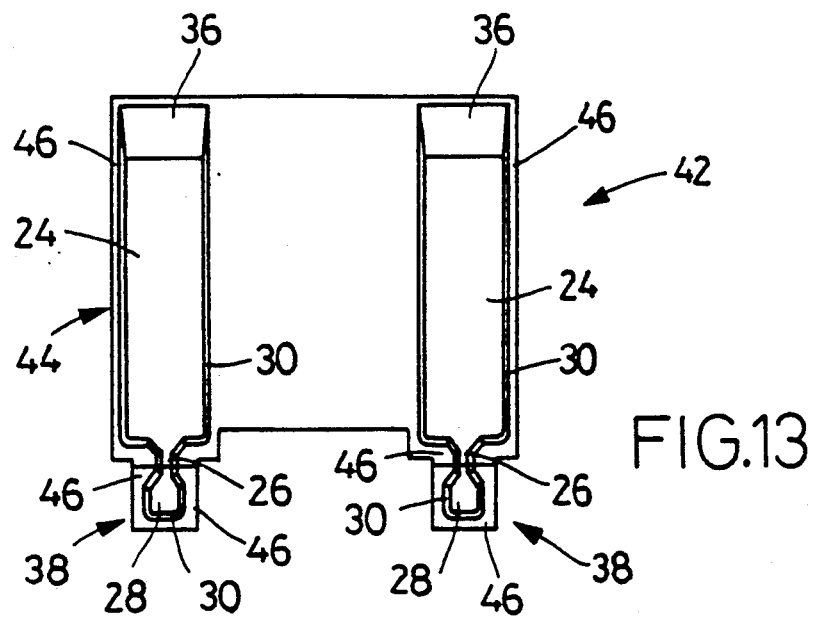
FIG. 13 is a plan view of the head core slider produced by cutting of the ferrite bar of FIG. 12.

Subsequently, the ferrite bar 18 is cut parallel to the air bearing portions 24, at parallel cutting lines as indicated at 40, 40 in FIG. 12, such that each cut segment which constitutes a head core slider 42 as shown in FIG. 13 includes the two air bearing portions 24.

Figure 14:
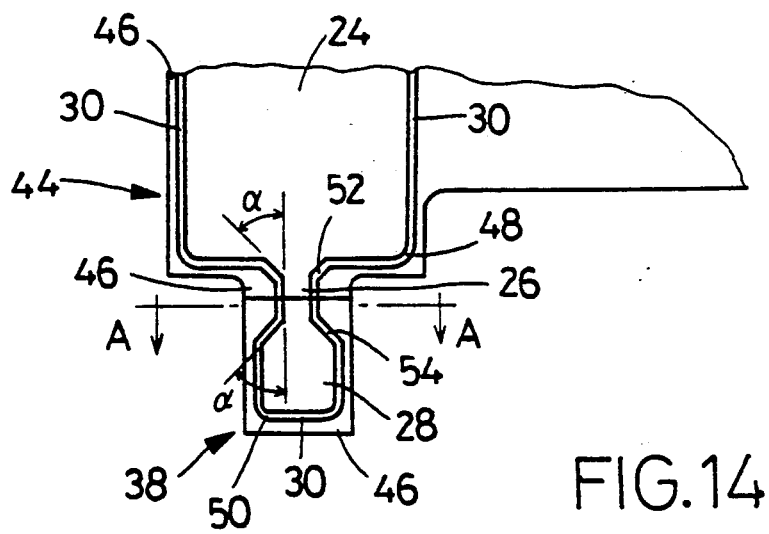
FIG. 14 is an enlarged fragmentary view showing the trailing end portion of the head core slider of FIG. 13.

As shown in FIG. 13, the head core slider 42 includes a slider body 44 provided with the two parallel air bearing portions 24, and the two yoke portions 38 each having the protrusion 28 which has the same height as the air bearing portions 24 on the slider body 44 and the width smaller than that of the air bearing portions 24. Between the trailing end of each air bearing portion 24 and the protrusion 28 of the yoke portion 38, the track portion 26 having the width smaller than the protrusion 28 is formed so as to bridge the air bearing portion 24 and the yoke portion 38. As indicated in FIG. 14, a relatively narrow stepped portion 46 is left along the two outer sides of each air bearing portion 24, and so as to surround the corresponding track portion 26 and yoke portion 38. It will be understood that this stepped portion 46 has the etched surface of the ferrite bar 18, and that the above-indicated height of the portions 24, 26, 28 is measured with respect to the flat portion of the stepped portion 46, as indicated in FIG. 15.

Figure 15:
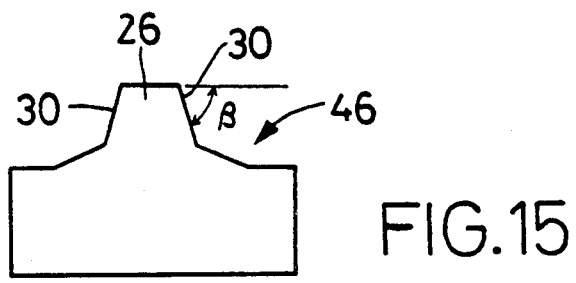
FIG. 15 is an elevational view taken in the direction of A—A of FIG. 14.

As depicted in detail in FIGS. 14 and 15, each of the head core sliders 42 produced according to this embodiment of the invention includes a pair of raised sections each of which consists of the slider body 44, track portion 26 and yoke portion 38. The slider body 44 has the two parallel air bearing portions 24 which are spaced apart from each other in a first direction and each of which has a predetermined height from the stepped portion 46 and a first width as measured in the first direction. The track portion 26 is formed integrally with the corresponding air bearing portion 24, so as to extend from the end of the air bearing portion 24 remote from the chamfered portion 36, in a second direction perpendicular to the first direction. The track portion 26 has the same height as the air bearing portion 24, and a second width which is smaller than the first width of the air bearing portion 24. The yoke portion 38 is formed integrally with the slider body 44 and the track portion 26, so as to extend from the end of the track portion 26 remote from the air bearing portion 24, in the second direction indicated above. The yoke portion 38 includes the protrusion 28 which has the same height as the air bearing portion and track portion 24, 26, and a third width which is smaller than the first width of the air bearing portion 24 and larger than the second width of the track portion 26. The slider body 44, the track portion 26 and the yoke portion 38 cooperate with each other to form a magnetic head core which has a closed magnetic path. The stepped portion 46 is left so as to partially surround the air bearing portion 24, and totally surround the track and yoke portions 26, 38. The stepped portion 46 has the flat part which is spaced apart from the top surfaces of the track and yoke portions 26, 38, by a distance nearly equal to the height of the portions 24, 26, 28. In the instant head core slider 42, the relative wide protrusion 28 of the yoke portion 38 is effective to protect the relative narrow track portion 26 against damage due to contact with a rigid magnetic disk when the disk is moved to the position for contact with the head core slider 42. Further, the width of the yoke portion 38 is selected to be smaller than that of the air bearing portion 24, for reducing the cross sectional area of the yoke portion 38 and thereby lowering its inductance and thereby permitting high-frequency recording of information on the magnetic disk, for increased density of recording per unit area of the disk.

In the instant core slider 42, corners 48 at the trailing end of the air bearing portion 24 and corners 50 at the trailing end of the protrusion 28 are rounded to suitable radii of curvature, to avoid right-angle edges at the corners, whereby damages of the magnetic disk and the slider 42 due to their contact may be significantly reduced.

Further, connections 52 between the track portion 26 and the air bearing portion 24, and connections 54 between the track portion 26 and the protrusion 28 are inclined or chamfered to avoid right-angle edges at the connections. This arrangement increases the strength of the track portion 24 at its end portions adjacent the air bearing portion 24 and the protrusion 28. The inclination or chamfer angle of the connections 52, 54 with respect to the longitudinal direction of the air bearing portion 24 is preferably within a range between 30° and 60°. While the connections 52, 54 may be rounded, the inclined configuration is preferred in this specific head core slider 42.

The air bearing portion 24, track portion 26 and protrusion 28 consist of a raised section which is left unremoved during the etching process of the ferrite bar 18, as described before. This raised section is formed with the inclined surfaces 30 indicated above, as depicted in enlargement in FIG. 15. The inclination angle $\beta$ of the inclined surfaces 30 with respect to the top surfaces of the portions 24, 26 and protrusion 28 is preferably within a range between 45° and 80°, more preferably within a range between 60° and 75°. If this angle $\beta$ is excessively large, the portions 24, 26 and protrusion 28 have sharp edges which easily chip. If the angle $\beta$ is excessively small, there arises a problem with the track portion 26. Namely, the effective recording width of the magnetic head and the effective recording width of the recording tracks of the magnetic disk are unfavorably increased, leading to a reduced recording density of the magnetic disk.

While the presently preferred form of the head core slider of the invention for a rigid magnetic disk drive and the presently preferred method for producing the head core slider according to the invention have been described in detail by reference to the accompanying drawings, it is to be understood that the invention is not limited to the precise details of the illustrated embodiment, but may be embodied with various changes, modifications and improvements, which may occur to those skilled in the art, without departing from the spirit and scope of the invention defined in the appended claims.

In the illustrated embodiment, the magnetic gap is formed in the track portion 26 such that the parts of the opposed surfaces of the butted first and second ferrite blocks 10, 12 define the magnetic gap. However, the principle of the present invention is also applicable to a composite magnetic head core slider wherein a magnetic metal layer is formed on at least one of the opposed surfaces of the ferrite blocks 10, 12, so as to define a magnetic gap therebetween. This composite magnetic head core slider is suitable for use with a recording medium which has a high degree of coercive force. The magnetic metal layer or layers may be formed by a suitable known method, in the area 10a or 12a, or areas 10a and 12a of the ferrite blocks 10, 12, as indicated in FIG. 2. These parts of the ferrite surfaces may be roughed or undulated before the magnetic metal layer or layers are formed thereon. The desired width of the track portion is formed by etching the magnetic metal layer or layers and the ferrite, such that the magnetic metal and the ferrite are etched at the same rate.

What is claimed is:

1. A method of producing a head core slider for a rigid magnetic disk drive, comprising the steps of:

preparing a first ferrite block from which a slider body is to be formed, and a second ferrite block from which a yoke portion is to be formed, and butting together said first ferrite block and said second ferrite block into an integral ferrite bar which defines a closed magnetic path having a magnetic gap;

forming an etching mask on a surface of said integral ferrite bar, said etching mask having a pattern which corresponds to a configuration to be formed on said surface of said integral ferrite bar, said configuration including (a) a pair of parallel air bearing portions provided on said slider body which are spaced apart from each other in a first direction (b) a track portion formed integrally with at least one of said pair of parallel air bearing portions, so as to extend from one of opposite ends of said air bearing portion in a second direction substantially perpendicular to said first direction, said track portion having a second width smaller than a first width of each of said air bearing portions in said first direction and (c) a protrusion provided on said yoke portion which extends from one end of said track portion remote from said air bearing portion in said second direction, said protrusion having a third width which is smaller than said first width and larger than said second width;

etching at least said surface of said integral ferrite bar, via said etching mask, so as to produce said configuration corresponding to said pattern of said etching mask, such that said pair of air bearing portions, said protrusion, and said track portion have a same predetermined height; and cutting the etched integral ferrite bar into a plurality of pieces each of which serves as said head core slider, such that each of said pieces which have said slider body, said yoke portion and said track portion is provided with a narrow stepped portion which surrounds at least said track portion and said protrusion, said stepped portion having a surface which is spaced apart from top surfaces of said track portion and said protrusion in a third direction perpendicular to said first direction and said second direction, by a distance corresponding to said predetermined height.

2. A method of producing a head core slider for a magnetic disk drive, comprising the steps of:

butting together a first and a second ferrite block to form a head core slider which defines a closed magnetic path having a magnetic gap;

forming an etching mask on a surface of said head core slider which is interrupted by said magnetic gap, said etching mask having a pattern comprised of an area corresponding to a track portion to be formed across said magnetic gap having a width in the direction parallel to said magnetic gap which is greater than or equal to the width of said magnetic gap and areas corresponding to portions to be formed adjacent each end of said track portion, each of said portions being wider in said parallel direction than said track portion; and etching said surface of said head core to produce a configuration corresponding to said pattern.

3. The method of claim 2, wherein said portions formed adjacent each end of said track portion consist of an air bearing portion and a protruding portion, respectively, which are spaced apart from each other by said track portion in a direction perpendicular to said parallel direction, said track portion having a second width which is smaller than a first width of said air bearing portion in said parallel direction, and said protruding portion having a third width which is smaller than said first width and larger than said second width in said parallel direction.

4. The method of claim 3, further comprising chamfering an end of said air bearing portion remote from said track portion.

5. The method of claim 3, further comprising rounding corners of an end of said air bearing portion adjacent said track portion and corners of an end of said protruding portion remote from said track portion.

6. The method of claim 3, further comprising forming an inclination in a top edge of connections between said air bearing portion and said track portion, and between said track portion and said protruding portion, wherein an angle of said inclination with respect to top surfaces of said track portion, said air bearing portion and said protruding portion ranges from 45°-80°.

7. The method of claim 2, wherein said protrusions formed adjacent each end of said track portion consist of an air bearing portion and a protruding portion, respectively, which are spaced apart from each other by said track portion in a direction perpendicular to said parallel direction, the method further comprising forming an inclination in a top edge of the periphery of said track portion, said air bearing portion and said protruding portion.

8. The method of claim 7, wherein an angle of said inclination with respect to top surfaces of said track portion, said air bearing portion and said protruding portion ranges from 45°-80°.

9. The method of claim 7, wherein an angle of said inclination with respect to top surfaces of said track portion, said air bearing portion and said protruding portion ranges from 60°-75°.

10. The method of claim 1, further comprising chamfering an end of said air bearing portion remote from said track portion.

11. The method of claim 1, further comprising rounding corners of an end of said air bearing portion adjacent said track portion and corners of an end of said protrusion remote from said track portion.

12. The method of claim 1, further comprising forming an inclination in a top edge of connections between said air bearing portion and said track portion, and between said track portion and said protrusion, wherein an angle of inclination with respect to top surfaces of said track portion, said air bearing portion and said protrusion ranges from 45°-80°.

13. The method of claim 1, further comprising forming an inclination in a top edge of the periphery of said track portion, said air bearing portion and said protrusion.

14. The method of claim 13, wherein an angle of said inclination with respect to top surfaces of said track portion, said air bearing portion and said protrusion ranges from 45°–80°.

15. The method of claim 13, wherein an angle of said inclination with respect to top surfaces of said track portion, said air bearing portion and said protrusion ranges from 60°–75°.

* * * * *

UNITED STATES PATENT AND TRADEMARK OFFICE
CERTIFICATE OF CORRECTION

PATENT NO. : 5,012,572

DATED : May 7, 1991

INVENTOR(S) : Matsuzawa, et al

It is certified that error appears in the above-identified patent and that said Letters Patent is hereby corrected as shown below:

On the title page, item [75] after "Nagoya", insert --Nobuhiro

Terada, Kasugai, all of Japan

Michael I. Aronoff, Goleta, Calif-- and delete "both of Japan"

Signed and Sealed this

Twenty-second Day of December, 1992

*Attest:*

DOUGLAS B. COMER

*Attesting Officer*      *Acting Commissioner of Patents and Trademarks*